J. F. Chase,
Harrow.
No. 113,141.
Patented Mar. 28, 1871.
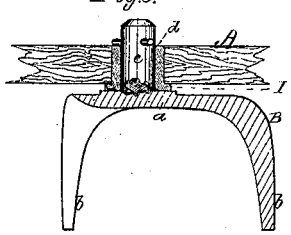
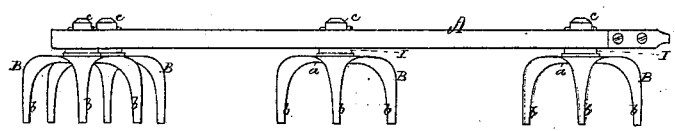
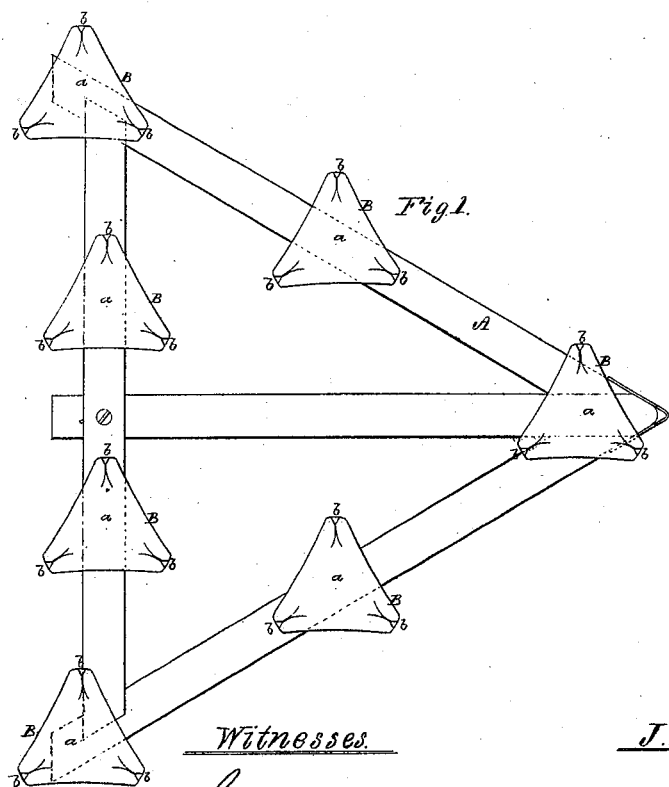
Witnesses.
S. N. Piper.
L. N. Miller.
J. F. Chase.
by his attorney
R. H. Eddy

United States Patent Office.

JOHN FRANCIS CHASE, OF WESTBROOK, MAINE.

Letters Patent No. 113,141, dated March 28, 1871.

IMPROVEMENT IN ROTARY-HARROWS.

The Schedule referred to in these Letters Patent and making part of the same.

*To all persons to whom these presents may come:*

Be it known that I, JOHN FRANCIS CHASE, of Westbrook, of the county of Cumberland and State of Maine, have invented a new and useful invention or Improvement having reference to Rotary Harrows, and do hereby declare the same to be fully described in the following specification and represented in the accompanying drawing, of which—

Figure 1 denotes an under-side view; and

Figure 2, a side elevation of a harrow provided with rotary three-pronged teeth, in accordance with my invention.

The main body of the harrow is a triangular frame, A, each tooth B being pivoted to the frame, and the several teeth being arranged relatively to the frame in manner as represented.

Each of the said teeth is composed of a base, $a$, and three prongs, $b\ b\ b$, made in one piece of metal, the prongs being bent down from and arranged relatively to the base in manner as represented.

At the center of its upper side such base is provided with a journal or pivot, $c$, to enter and revolve in a bearing or box, $d$, fitted into the frame A.

Each prong is triangular in its horizontal section.

Figure 3 denotes a cross-section of a tooth, B, its journal, and the bearing or box thereof, and that part of the frame A in which the latter is fixed.

The edges of the base between the prongs are sharp or angular, in order to prevent the tooth from being clogged by roots or stones. The prongs, by being triangular, readily slip by an opposing stone or root while the harrow may be in operation.

A harrow as provided with rotary three-pronged teeth, made as described, operates somewhat differently from common rotary harrows, having a large number of teeth set in a rotary frame or wheel pivoted to the main frame of the harrow.

In my improved harrow, in the place of a single-pronged tooth, as ordinarily applied to the frame, I use a trifurcated or three-pronged rotary tooth, made as described, the object being to enable the tooth to more readily pass an obstruction as well as to stir up the earth to better advantage than a single-pronged tooth stationary relatively to its frame, thereby gaining the advantages of a rotary harrow with those of strong and durable teeth.

I make no claim to a rotary harrow as constructed with teeth set in one or more rotary frames applied to a body or frame.

I claim—

As a new manufacture, a rotary harrow-tooth, composed of the prongs $b$ and a sharp-edged base, $a$, arranged and formed in one piece of metal, and provided with a central pivot or bearing, all substantially as described.

JOHN F. CHASE.

Witnesses:
R. H. EDDY,
S. N. PIPER.